United States Patent [19]

Greenspan

[11] Patent Number: 5,006,885
[45] Date of Patent: Apr. 9, 1991

[54] SUPERIMPOSING IMAGE APPARATUS

[76] Inventor: Nathan Greenspan, 3908 N. 29th Ave., Hollywood, Fla. 33020

[21] Appl. No.: 579,599

[22] Filed: Sep. 10, 1990

[51] Int. Cl.5 .................. G03B 27/52; G03B 27/70
[52] U.S. Cl. ................................... 355/43; 354/109
[58] Field of Search ................. 355/43, 46, 65, 66; 354/109, 122, 110

[56] References Cited

U.S. PATENT DOCUMENTS

| | | | |
|---|---|---|---|
| 1,482,070 | 1/1924 | Douglass | 354/110 |
| 2,651,233 | 9/1953 | Tondreau, et al. | 354/110 |
| 3,628,430 | 12/1971 | Morse | 355/43 X |
| 3,673,932 | 7/1972 | Rottmiller | 355/43 X |
| 3,819,264 | 6/1974 | Voorhees | 355/43 |
| 4,459,015 | 7/1984 | Brecht | 355/46 |

Primary Examiner—Richard A. Wintercorn
Attorney, Agent, or Firm—Oltman and Flynn

[57] ABSTRACT

A superimposing image apparatus for superimposing a first view on a second view, including an optical imaging system which has a given focal length, an image plane and given field of view which encompasses the second view, and an arrangement for translationally moving a first mirror within the aforesaid field of view and positioned so as to project at least a part of the first view into the lens system, superimposed on the second view.

In accordance with a second feature, there is provided a superimposed image apparatus wherein at least one of the first and second views is disposed at the given focal length of the lens system.

In accordance with still another feature, there is provided superimposing image apparatus which includes a second mirror disposed outside the field of view for reflecting the first view onto the first mirror.

In accordance with yet another feature, there is provided a superimposing image apparatus wherein the translation apparatus for translationally supporting the first mirror has at least one linear axis of translation.

The invention may further include apparatus wherein the translation apparatus has a sheet of transparent material for mounting the first mirror, wherein the sheet of transparent material is attached to the apparatus for translationally moving the first mirror, and the invention may optionally include apparatus wherein the first mirror is partially transparent and/or tinted.

10 Claims, 2 Drawing Sheets

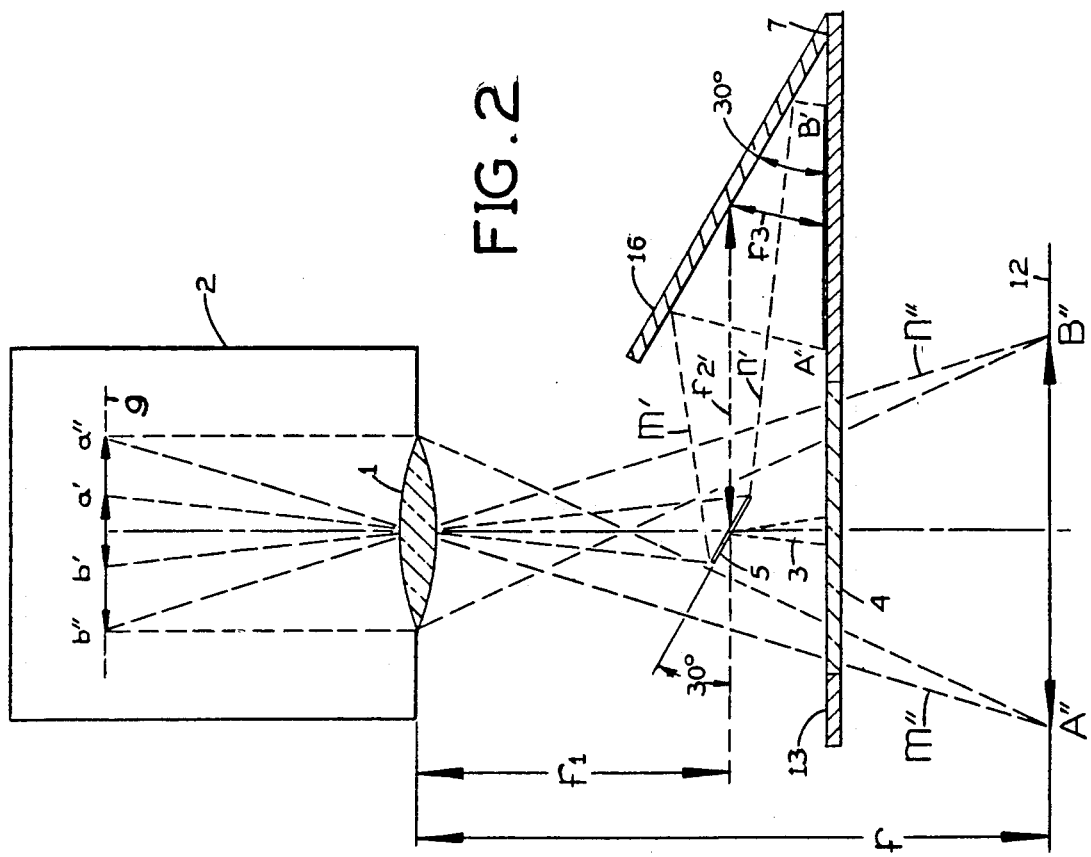
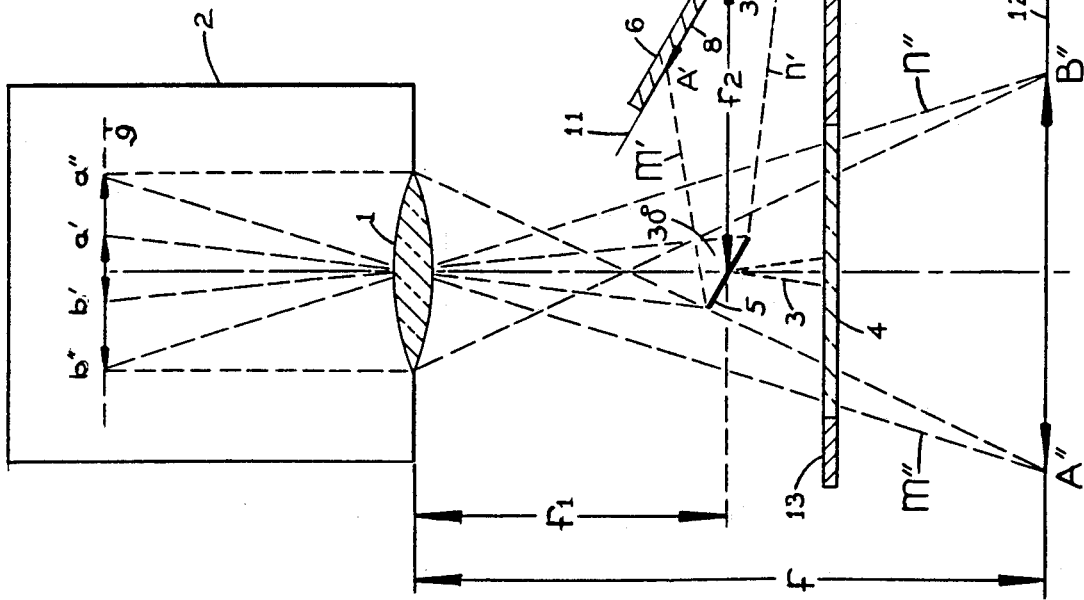

SUPERIMPOSING IMAGE APPARATUS

The invention relates to a superimposing image apparatus, and more particularly to an imaging apparatus for creating an image of at least one view superimposed upon a larger view.

BACKGROUND AND PRIOR ART

The art of composing images as composites of two or more images has long been known in the graphic arts industry. As an example, U.S. Pat. No. 4,459,015 shows an apparatus for producing indicia-bearing laminated cards, which uses two cameras successively activated to take consecutive exposures of general data and specific data to be superimposed. U.S. Pat. No. 3,819,264 shows apparatus for high speed production of illustrated combined textual material.

The apparatus of the known art, however, has certain drawbacks when used for artistic type composites, in that they generate sharply defined borders between the various parts of the composite image. In addition, the known apparatus are generally cumbersome with many interacting component parts that tend to be bulky and expensive in construction.

It is accordingly a primary object of the instant invention to provide a superimposing image apparatus that overcomes the drawbacks of the known devices and is simple in construction and can be used to create superimposed images that are sharply delineated on the final image but have soft transition areas separating the various superimposed images.

In the ensuing description the following nomenclature is used; various "views" can be superimposed to form a composite "image", wherein each "view" can be a picture, photograph, a real object, background material and the like, while the composite image, or simply "image" is formed on an image plane, typically a photographic film.

It is another important object to provide a superimposing image apparatus wherein a superimposed view can be readily laterally translated within a field of view of a larger view.

SUMMARY OF THE INVENTION

In accordance with the invention there is provided a superimposing image apparatus for superimposing a first view on a second view, including an optical imaging lens system which has a given focal length, an image plane and a given field of view which encompasses the second view, an arrangement for translationally moving a first mirror within the aforesaid field of view and positioned so as to project at least a part of the first view into the lens system, superimposed on aforesaid second view.

In accordance with a further feature there is provided a superimposing image apparatus according to the invention, wherein at least one of the first and second views is disposed at the given focal length from the lens system.

In accordance with still another feature, there is provided a superimposing image apparatus according to the invention which includes a second mirror disposed outside the field of view for reflecting the first view onto the first mirror.

In accordance with a still further feature, there is provided a superimposing image apparatus wherein the translation apparatus for translationally supporting the first mirror has at least one linear axis of translation.

The invention may further include apparatus wherein the translation apparatus has a sheet of transparent material for mounting the first mirror wherein that sheet of transparent material is attached to the apparatus for translationally moving the first mirror, and the invention may optionally also include apparatus wherein the first mirror is partially transparent, and/or tinted.

Further objects and advantages of this invention will be apparent from the following detailed description of a presently preferred embodiment which is illustrated schematically in the accompanying drawings.

BRIEF DESCRIPTION OF THE FIGURES

FIG. 1 is a diagrammatic elevational view of the invention showing the basic principle of superimposition of two views.

FIG. 2 is another diagrammatic elevational view of the invention showing the additional feature of an inverting second mirror.

Figure 3:
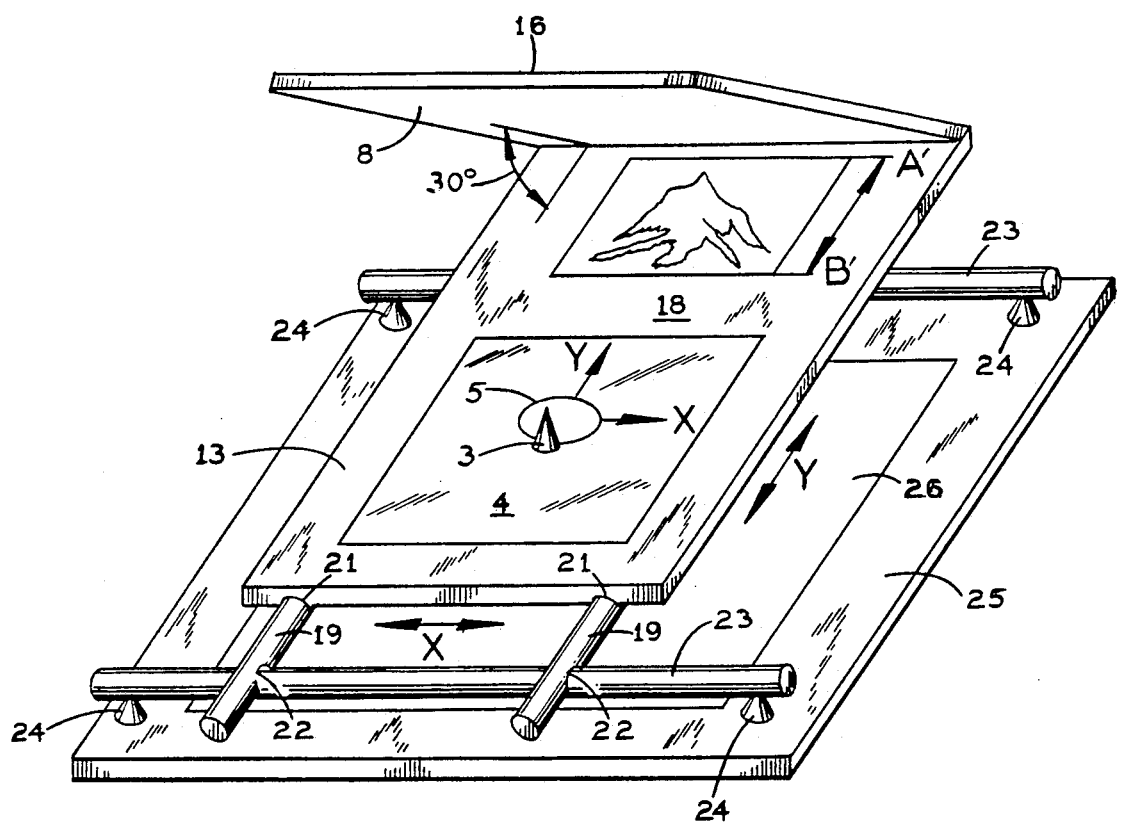
FIG. 3 is a perspective elevation of details of the image translation system.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENT

In FIG. 1 an optical imaging lens system is shown as a single flat plane lens 1 in one side of a camera 2 having an image plane 9, shown as a dashed line representing e.g. a photographic film or any other image sensing device. A first object A'-B' within a field of view defined by "rays" m'-n', shown in dashed lines, disposed in a first plane 11, is mirrored in a small first mirror 5, which reflects a mirror image, i.e. a view of the object A'-B' into the lens 1, which forms an inverted virtual image a'-b' on the image plane 9. A second object A"-B" disposed in a second plane 12 within the field of view, defined by "rays" m" and n", is projected as an inverted image a"-b" on the image plane 9. The first and second planes 11, 12 are each disposed at the proper focal length f from the lens 1, such as to present respective sharp images b'-a' and b"-a" on the image plane 9. The first mirror 5 is disposed at a shorter distance f1 from the lens 1, causing the reflected image of the edge lines of the first mirror 5 to be shown blurred and soft on the image plane 9. The distance from the first mirror 5 to the first plane 11 is f2, and accordingly the sum f1+f2 is equal to the focal length f so that objects A'-B' and A"-B" are shown with sharp images on the image plane 9. Both mirrors may be e.g. at 30° with horizontal. Both are high grade first surface coated to avoid refraction.

The first mirror 5 is supported in an x-y plane on a transparent plate 4 on a small post 3. The transparent plate 4, shown cross-hatched in cross-section in FIG. 1, is recessed into a carrier plate 13, indicated in cross-section by cross shading. The plate 4 may be of glass or transparent plastic, and is suspended such that it is translatable in two perpendicular axes x and y in the x-y plane best seen in FIG. 3, and is parallel with the image plane 9 and the second plane 12.

The first view A'-B' is mounted on an upstanding plate 6 attached at its lower edge 7 to the carrier plate 13 and has attached to its inward-facing side 8 the object representing the first view A'-B'.

As the carrier plate 13 is moved in the x-y plane the two distances f1 and f2 remain constant and the first view A'-B' remains in focus as the first view A'-B' is positioned in the x-y plane.

FIG. 2 is a further development of the structure shown in FIG. 1, which includes a second mirror 16 which serves to reflect the first view A'-B' onto the first mirror 5, which in turn reflects the first view onto the image plane 9, superimposed on the second view A"-B" as described above. The first view A'-B' in this arrangement is mounted horizontally on the carrier plate 13 within the field of view of the "rays" m'-n'. Again the focal length f1-f2 remains constant as the carrier plate 13 is positioned in the x-y plane. The use of a second mirror has the advantage that the superimposed image on the image plane is corrected for mirror inversion, as a result of the double reflection. Both mirrors are at an angle of 30° to horizontal.

The camera 2 typically has all the features of a conventional camera such as film transport, shutter, variable lens opening, and so forth, which do not require special description, since the instant invention is not directed to such features.

FIG. 3 shows details of the translation arrangement, including the carrier plate 13 forming a frame 18 for holding the transparent sheet 4, and two y-bars 19 for slidably supporting the frame 18 via two y-oriented grooves 21 on the underside of the frame 18. The y-bars 19 have at their ends grooves 22 that enable them to slide in the x-direction on two x-bars 23, which is mounted the object 26 representing the second view A"-B'.

It follows that more than one view A'-B' can be superimposed on the view A"-B" by means of a corresponding number of first mirrors 5, each serving to reflect a respective one of the views A'-B' onto the image plane 9. In this way it is possible to superimpose, i.e. combine multiple photos, drawings, art scenes, transparencies, etc., including real objects. Which can be blended, fused or otherwise joined to create special effects and fantasy results. Furthermore, graphic printing, names, information, and so forth can be incorporated into one image.

It also follows that the first mirror 5 may be partially transparent and/or tinted to further create optical effects, and it may be pivotably attached to the post 3 for adjustment of the reflecting angle. It also follows that the translation arrangement may have a vertical axis so that further optical effects can be created.

I claim:

1. A superimposing image apparatus for superimposing at least one first view on a second view, comprising optic means having a given focal length and an image plane for receiving said first and second views, at least one first mirror for reflecting said first view onto said image plane, wherein said first and second views are disposed at distances from said optic means equal to said given focal length, and said first mirror is disposed at a distance from said optic means different from said given focal length.

2. Superimposing image apparatus according to claim 1, wherein said first and second views are disposed in respective first and second planes, and wherein said image plane is parallel with said second plane.

3. Superimposing image apparatus according to claim 1, including a second mirror for reflecting said first view onto said first mirror.

4. Superimposing image apparatus according to claim 1, including translation means for translationally moving said first mirror in an x-y plane parallel with said image plane.

5. Apparatus according to claim 4, including a sheet of transparent material for supporting said first mirror, and connecting means for connecting said sheet of transparent material to said translation means.

6. Apparatus according to claim 5, wherein said translation means include a frame enclosing said sheet of transparent material, a set of y-bars slidably supporting said frame, and a set of x-bars perpendicular to said y-bars for slidably supporting said y-bars.

7. Apparatus according to claim 1 including a camera for containing said image plane and said optic means.

8. Apparatus according to claim 1, wherein said first mirror is rigidly connected with an object representing said first view.

9. Apparatus according to claim 1, wherein the distance between said first view and said first mirror is equal to f2, and the distance between said optic means and said first mirror is equal to f1, and f1+f2 is constantly equal to said given focal length.

10. Apparatus according to claim 3 wherein said second mirror is disposed at an angle substantially equal to 30° with said image plane.

* * * * *